United States Patent [19]
Burgess

[11] Patent Number: 5,346,774
[45] Date of Patent: Sep. 13, 1994

[54] FIBER-REINFORCED COMPOSITE STRUCTURES, AND METHODS OF MAKING SAME

[75] Inventor: Keith E. Burgess, Kennebunk, Me.

[73] Assignee: Techniweave, Inc., Rochester, N.H.

[21] Appl. No.: 842,647

[22] Filed: Feb. 27, 1992

[51] Int. Cl.$^5$ .......................... B29B 7/00; B32B 3/28
[52] U.S. Cl. .................. 428/542.8; 428/113;
428/166; 428/167; 428/174; 428/178; 428/188;
428/225; 428/227; 428/257
[58] Field of Search ............... 428/542.8, 156, 167,
428/172, 113, 120, 212, 121, 74, 174, 102, 105,
130, 166, 178, 188, 192, 225, 227, 253, 257

[56] References Cited

U.S. PATENT DOCUMENTS

| | | | |
|---|---|---|---|
| 1,594,261 | 7/1926 | Herschmann | 428/178 |
| 2,019,233 | 10/1935 | Nicol | 428/178 |
| 4,542,055 | 9/1985 | Fitzsimmons | 428/102 |

Primary Examiner—Donald J. Loney
Attorney, Agent, or Firm—William G. Rhines

[57] ABSTRACT

Fiber reinforced composite structures and preforms for making same, and methods for making such structures and such preforms, are disclosed. In the preforms, at least two constituent elements are woven from yarns made from material of desired characteristics and the elements are joined at a juncture therebetween by fibrous material that is common to and integral with said elements. At least one of the elements includes at least one internal pocket that is adapted to contain a reinforcement member that produces improved shear stiffness and/or shear strength in the preform when it is matrix infiltrated. In preferred embodiments, three such elements are oriented at right angles to each other, with reinforcement pockets included in two of the three elements. Preforms so made may then be infiltrated with matrix material.

16 Claims, 5 Drawing Sheets

FIBER-REINFORCED COMPOSITE STRUCTURES, AND METHODS OF MAKING SAME

BACKGROUND OF THE INVENTION

This invention relates to the field of fiber reinforced materials. It is known in that field that filaments of material may be combined with a matrix to produce a composite material that exhibits desired qualities of the constituent materials and frequently some qualities not possessed by the individual constituents as such.

One method of making fiber reinforced composite material is to combine the fibers in layers or laminae in each of which the fibers are oriented in such a manner as to impart desired properties to the finished product. For example, a composite made with carbon filaments oriented in one direction exhibits higher stiffness properties in that direction but exhibits properties more typical of the matrix in the direction perpendicular to that in which the filaments are oriented. By adding one or more layers of fibers that are oriented perpendicular to the fibers in the original layers, the stiffness properties can be improved in the direction of orientation of the fibers comprising the added layers as well. Such a composite is then said to have orthogonal fiber orientation. One of the limitations of such orthogonally reinforced composites is that their resistance to shear deflection is not dominated by the properties of the fibers but rather by those of the matrix material. Typically, this is corrected by adding plies in which the fibers are oriented at an angle other than that of one of the orthogonal directions. The effect is analogous to that of a cross brace in a screened door or a wind brace in a building structure, as the shear or racking resistance then becomes a function of the properties of these off-angle reinforcements. The governing principles for predicting the properties of such multidirectionally reinforced composite materials are known per se.

While successfully addressing some of the difficulties as noted above, fiber reinforced composite materials of this type, which are generally referred to as a "laminated composite" materials, still exhibit several undesirable characteristics. The properties of such composites in directions which are more or less perpendicular to the plane of the base plies previously described are still matrix, rather than fiber, dependent and thus exhibit the comparatively less desirous characteristics of the matrix. Further, the fibrous layers cannot be made to intersect. Therefore, any structural shape having intersecting planes of laminated composite material will continue to be dominated in the region of intersections by the comparatively more limited characteristics of the matrix rather than of the fibers. An example of such a structure, useful to reinforce structurally a reinforced composite panel against deflection in directions normal to the plane of the panel, is one in which rib type stiffener members located at one surface of the panel are attached to it and to each other, effectively subdividing the panel into smaller panels. Since the fibrous layers of any given rib cannot be made to intersect with those of the panel or the other ribs, each interface between them effectively becomes matrix dependent for its properties because the matrix material itself, and not fibrous material, becomes the transition material between the overlying fibrous layers in the regions of such interfaces. Since the strength and stiffness properties of the fibers frequently are as much as 20 times higher than those of the matrix material, these limitations become serious obstacles to the effective utilization of the properties of the fibers.

An alternative to using laminated plies of reinforcing fibers is to utilize so-called Three-Dimensional ("3-D") weaving methods to fabricate a "preform" of integrally woven strands of fibers. In this context, the term "Three-Dimensional" means that, as contrasted with the usual weaving or other positioning of textile strands and/or fibers in substantially planar arrays, textile constituents are included in the form of strands and/or fiber arrays oriented at an angle with respect to such planar arrays. This may be achieved by weaving the fibers materials of the planar array in undulating fashion about vertical rods located where reinforcing ribs or other intersecting walls are to be positioned. The portions which are to become the desired walls or ribs are built up with the textile materials to produce the "3-D" or "Three-Dimensional" portion of the structure. Later, the rods are removed and replaced by yarns or other textile fiber arrays that are pulled or woven through the channel-like voids that had been occupied by the rods. A version of this type of structure is an orthogonal Three-Dimensional "weave", where each of the three directions is orthogonal to the other two directions. A textile structure so made usually is fabricated first, and the matrix material subsequently injected into it. The base textile structure before matrix infiltration is usually called a fiber "preform". Such orthogonal, Three-Dimensional preforms can overcome one of the limitations of a prior art laminated composite by enabling planes of material to intersect with each other with reinforcing fibers penetrating and becoming integral with both planes at each intersection or abutment. Although this can solve the matrix dominated intersection problem, it does not result in fiber orientations that effectuate high shear properties. It has previously been noted that the shear properties can be improved in any one plane by adding fibers that are oriented in one or more directions other than those of the other yarns (which are usually vertical and horizontal) within that plane. In the case of a rib stiffened panel, this can be used to cause the panel to have both good orthogonal properties and good shear characteristics; i.e., to have "quasi-isotropic" properties. However, the properties of the ribs themselves would still be dictated by and have the previously described limitations resulting from their substantially orthogonal fiber orientation in the plane perpendicular to the panel. Thus, this method of preform fabrication does not produce fiber orientations necessary to achieve quasi-isotropic properties in two intersecting planes.

To overcome these objections, the constituent laminae might be stitched together with enough stitching density to improve the properties perpendicular to the laminae. However, this approach also has drawbacks, including damage to the reinforcing fibers in the laminae, inability to incorporate high stitching densities near the intersections of the planes in the preform, and not resolving the discontinuities in the laminae where they join.

Another approach to overcoming these objections might be to combine "3-D" weaving techniques with lamination methods by attaching plies of woven fabric to the exterior of the 3-D preform, with the objective of having the resulting combination exhibit desired properties simultaneously in both the laminated and 3-D portions of the composite structure. This might be done by so orienting the fibers constituting the woven fabric plies that they compensate for the orthogonal limitations of the 3-D perform. A principle limitation of this approach is in attaching the plies to the outside of the preform rather than distributing them through the thickness. This is not good design practice, and it becomes more objectionable as the thickness increases.

Accordingly, it is an object of this invention to produce preforms for fiber reinforced composite structures.

Still another object of this invention is to produce such preforms utilizing so-called "Three-Dimensional" weaving techniques.

Yet another object of this invention is to produce such preforms which will satisfy one or more of the foregoing objectives in which non-orthogonal reinforcing fibers are interspersed with the orthogonally oriented fibers.

Still another object of this invention is to produce such preforms which will satisfy one or more of the foregoing objectives and include reinforcing fibers oriented so as to resist shear deflection in each of multiple intersecting and abutting planes.

Another object of this invention is to produce such preforms which will satisfy one or more of the foregoing objectives and include fibers continuous through the intersections of intersecting and abutting planes of the preform to allow tension and compression stresses to be transmitted through such intersections by fibers in addition to matrices.

Still another object of this invention is to produce such preforms which will satisfy one or more of the foregoing objectives and include ribs or other stiffeners attached a panel and/or other elements of the preform by fibers which are integral with both.

Yet another object of this invention is to produce fiber reinforced composite structures in which preforms which satisfy one or more of the foregoing objectives are incorporated into a matrix material.

STATEMENT OF INVENTION

Desired objectives may be achieved through practice of this invention, embodiments of which include a fiber preform for incorporation with a matrix into a fiber reinforced composite structure, as well as such fiber reinforced composite structures per se, and methods of making same, wherein the preform is made to consist of at least two fibrous elements which intersect or abut each other angularly at junctures where they are joined by fibers which are are in common and integral with both, at least one of which members is made to include at least one internal pocket that contains material that is of desired characteristics to improve selected physical characteristics, such as shear stiffness and/or shear strength, of that member when the preform is matrix infiltrated.

BRIEF DESCRIPTION OF THE DRAWINGS

This invention may be understood from this specification and the claims which follow, and from the accompanying drawings in which

DESCRIPTION OF PREFERRED EMBODIMENTS

Figure 1:
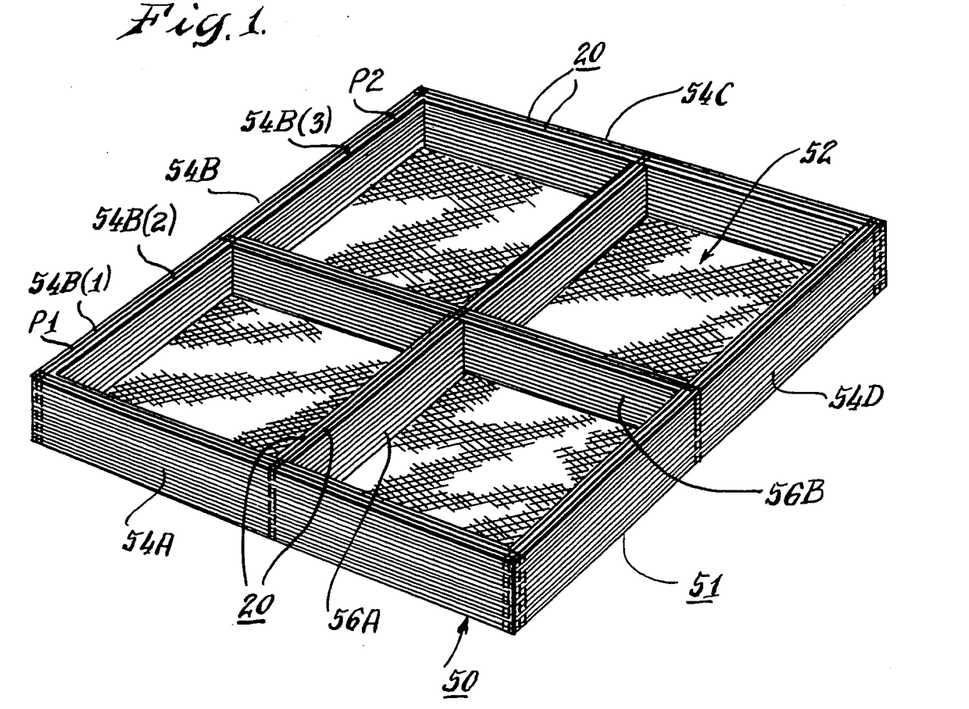
FIG. 1 is a perspective view of an embodiment of this invention.

Referring first to FIG. 1, there is illustrated a composite fiber reinforced composite material preform 50 which embodies this invention. As shown, it includes a panel or base portion 52, and rib type stiffeners in the form of peripheral sidewall ribs 54A, 54B, 54C and 54D, and midspan ribs 56A and 56B. It is to be noted, and as will be apparent presently, that although this particular embodiment is shown to be in the form of a rib reinforced panel, it is within the contemplation of this invention that other structures involving virtually any form of juncture, whether abutments or intersections or both, between constituent elements, regardless of exact dimensions and/or configuration, may be utilized. Thus, abutting and/or intersecting members without any associated panel, or junctured panels as such, may be involved, and still practice these teachings. Further, although in this illustration, rib structures are shown on one side of the associated panel, elements in forms other than in the configuration of the ribs as shown may be used, and elements may be constructed in other locations, including the opposite surface of the base panel or other base element, in addition or in the alternative.

The structural elements involved may be made from a variety of materials appropriate to the intended use. Typically, however, they will be selected on the basis of their mechanical and thermal characteristics, having in mind their intended uses and exposures. They might include fibers of carbon, graphite, glass, ceramic, etc. As such, they are made into a preform for subsequent infiltration by and encapsulation in a matrix of material which also is of appropriate characteristics for the intended use. Examples include epoxy, ceramic, carbon or other material. Usually the materials from which the preform is formed are yarn-like bundles of reinforcing fibers. It is to be understood that within the contemplation of this invention, the terms "yarn", "yarn-like" and the like are intended to mean any elongated continuum of material regardless of its exact cross-sectional configuration. Thus, these terms include monofilaments, multifilaments, spun yarns, and roped or cabled structures, as well as any other elongated continuum.

It should be noted that each of the reinforcing rib elements shown in FIG. 1 is made up of more than one layer. Thus, sidewall reinforcement 54B, for example, is shown to consist of three individual wall elements: i.e., elements 54B(1), 54B(2), and 54B(3). It will be apparent that although three such wall elements are shown for each of the ribs illustrated in FIG. 1, it is within the contemplation and teachings of this invention that two or more such walls may be used. These ribs may be made from the same type of materials as is the base: i.e., "yarns" of graphite, glass, etc., as may be appropriate to the intended use of the end product in which the preform is to be used. The "pockets" thus formed between the constituent walls of each such reinforcing rib (e.g., pockets P1, P2 between walls 54B(1) and 54B(2), and 54B(2) and 54B(3) respectively) are designed to become receptacles for material 20 to further enhance the structural properties of the rib. As will also be apparent, the entire group of structural constituents, in this example consisting of the base panel element, the rib elements, and the reinforcement material that is positioned within the rib wall "pockets", may be integrated into a structurally unified whole with the infiltration of matrix material as will be described. Optionally, the preform may be temporarily held together by stitching or by any other appropriate means to facilitate whatever handling might be involved to complete it.

Figure 2:
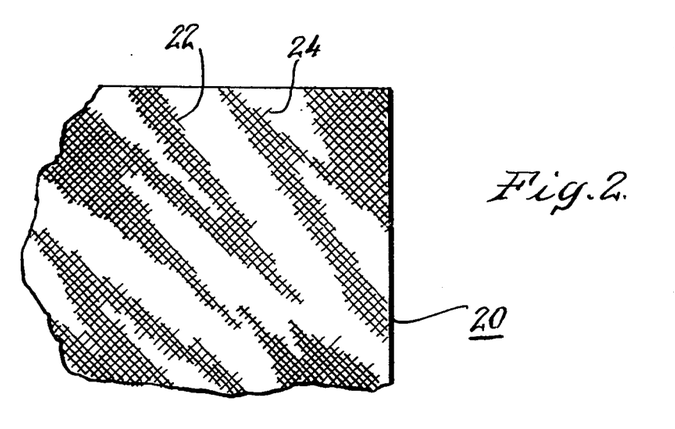
FIG. 2 is a top elevation view of a component of the embodiment of this invention shown in FIG. 1, FIGS. 3A through 3D inclusive are plan views of embodiments of this invention, and FIGS. 3E through 3G inclusive are plan views of other embodiments of this invention.

FIG. 2 illustrates a design for reinforcement material 20 appropriate for insertion into such pockets to perform the desired function of imparting desired shear characteristics to the ribs. Again, it is to be understood that the material shown for this use is merely illustrative of the type of material that may be employed. It will be apparent from what follows that the structural purpose of this material will be to impart improved shear characteristics and/or other characteristics in directions not otherwise served to that end by the constituent fibers from which the member itself is formed. To that end, the objective in this example will be to incorporate material by which either or both the shear stiffness and the shear strength of the combined structure in its final, matrix infiltrated state, will be improved as contrasted with those properties of a comparable rib structure when matrix infiltrated but without such incorporated reinforcement material. A wide variety of materials may be appropriately so used, including not only fibrous or other "textile" structures having fibers oriented at any of a variety of selected angles, but randomly oriented masses of fibers as well, and "non-textile" materials such as thin sheets of metal or other materials which exhibit the desired characteristics.

As shown in FIG. 2, this pocket insert material is in the form of a flat ribbon or sheet 20 made by weaving yarns 22 and 24 which cross each other at about 90 degrees. While this may be done by a variety of means, one approach is to interweave textile yarns in the manner commonly used to weave cloth, for example. The material is cut so that its constituent yarns intersect the long edges of the ribbon 20 at about 45 degrees. The ribbon 20 is thereby rendered to provide bias oriented reinforcement fibers that may be positioned in the pockets formed as part of the finished structure of each rib; e.g., in the pocket P1 between rib element walls 54B(1) and 54B (2), and in the pocket P2 between rib element walls 54B(2) and 54B(3). By this means, the overall structural properties of the preform, and therefore of the matrix infiltrated composite structure, are rendered superior since such reinforcements improve its physical characteristics (e.g., the shear stiffness and/or the shear strength) in the plane of the rib. Effectively, in this case, the reinforcement material will have supplied fibers oriented at off-angles with respect to those of the ribs themselves. This then represents a convenient way of introducing arrays of fibers (albeit in the form of the constituent yarns of a woven piece) in the desired location and orientation. Of course, the exact form, composition, characteristics, amounts and design of the reinforcements used and their angular orientation, if that is a critical consideration (as with fiber arrays) in imparting desired shear characteristics to the completed construction, and their exact position within the rib pockets may be varied according to the intended use and known per se practices in the cognizant arts. The reinforcement materials so positioned may then be left loose temporarily and later secured in place by the introduction of the matrix material, or may be retentively secured by known per se means such as adhesives or stitching.

FIGS. 3A through 3G inclusive illustrate, in plan view and in greater detail, elements and steps in a Three-Dimensional weaving method which may be utilized in making a preform for a rib reinforced panel of the type shown in FIGS. 1 and 2. The structures and construction techniques that will be described are in the general category of what is known in the cognizant arts as "Three-Dimensional" or "3-D" textiles and weaving.

Figure 3A:
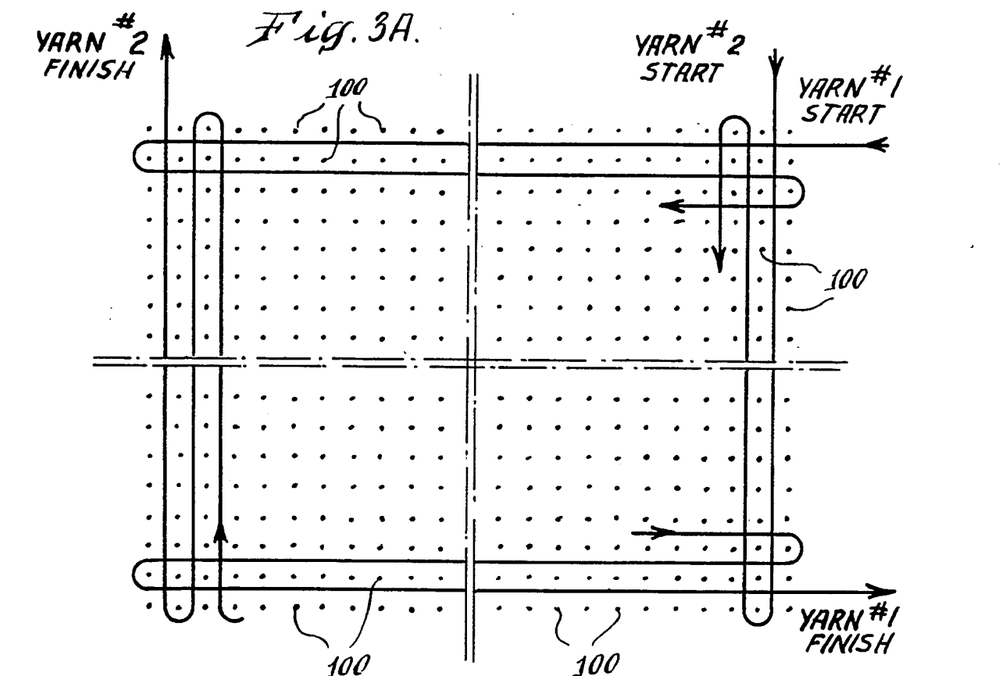
Figure 3B:
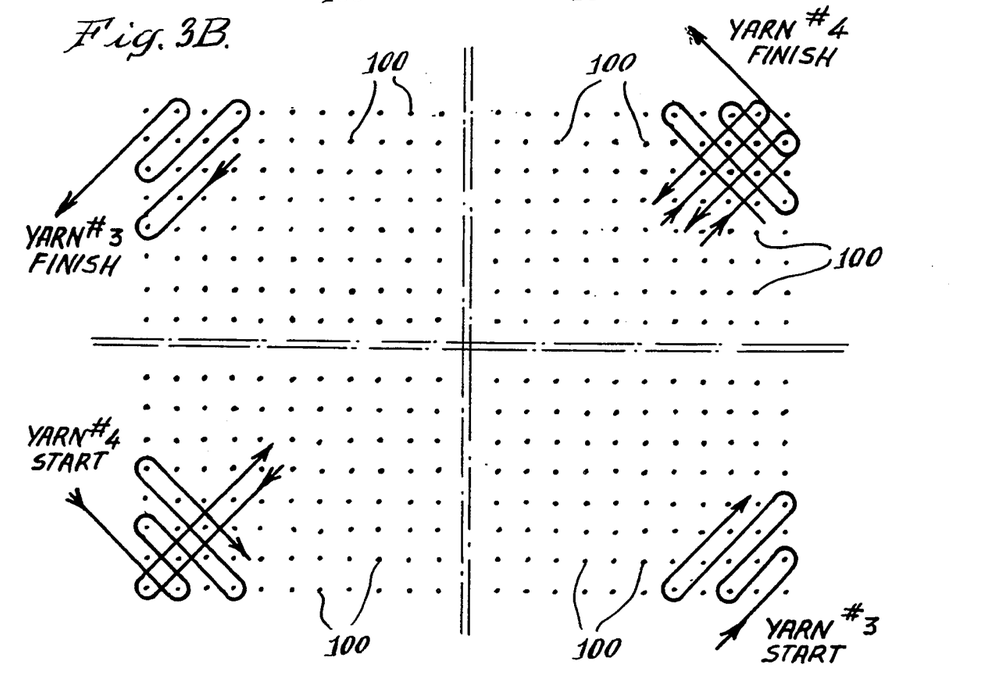

FIGS. 3A and 3B relate to the base or panel portion of the resulting preform, while FIGS. 3C through 3G inclusive refer to associated rib portions. Referring first to FIG. 3A, there is illustrated the top ends of a multiplicity of weaving rods 100 to be used as a form upon which to weave a desired embodiment of three dimensional preform. First, yarn #1 is installed between the first and second top horizontal rows of rods, from the right end to the left end, where it is reversed and installed in the opposite direction between the second and third rows of rods, and so forth, from the top to the bottom of the rod array. Next yarn #2 is started from the top end of and between the two righthand rows and installed downward between them to their bottom end, then reversed and installed upward between the second and third righthand vertical rows, and so forth up and down from right to left across the array of rods. Next, as shown in FIG. 3B, yarn #3 is started inside the first rod in the lower righthand corner and installed between rows of rods, but at 45 degrees to the edges of the rows of rods rather than parallel to them, back and forth in sequential spaces between rows of rods, until yarn #3 emerges at the upper left hand corner. Yarn #4 then is similarly installed, but at 90 degrees to yarn #3, and beginning at the lower left hand corner and finishing at the upper right hand corner. This sequence of layers of yarns may be carried out in whole or in part a number of times in order to increase the thickness, and therefore the mass and strength, of the base element. In doing so, it is preferable to have any yarns which run in a direction which replicates that of an earlier such run offset by at least one rod from that precursor run, as this will result in the alteration of direction reversal loops as between those runs. It is to be noted that the sequence described, in itself as well as in any further layering to increase thickness and mass, produces fiber arrays which are closely spaced apart from each other; that the successive arrays contact each other; and that the yarn runs in a given array are oriented at an angle with respect to those of each adjacent array. It is also to be noted that by the successive layers of yarns overlying each other at different angular orientations while passing by the forming rods 100, effectively vertical channels are created through the thickness of the element so formed. Although, at this stage, occupied by the rods, selected among them may subsequently be occupied by other yarns which replace certain of the rods, as will be described later in further detail. The effect of this configuration of yarn arrays is to produce a base member preform element that is basically an orthogonal system (from yarns #1 and #2), that is "cross-braced" in one orientation that is angular thereto (by yarn #3) and is also "cross-braced" (by yarn #4) in the 90 degree orientation to the previous angular array (i.e., Yarn #3), and has channels therethrough at selected locations.

Figure 3C:
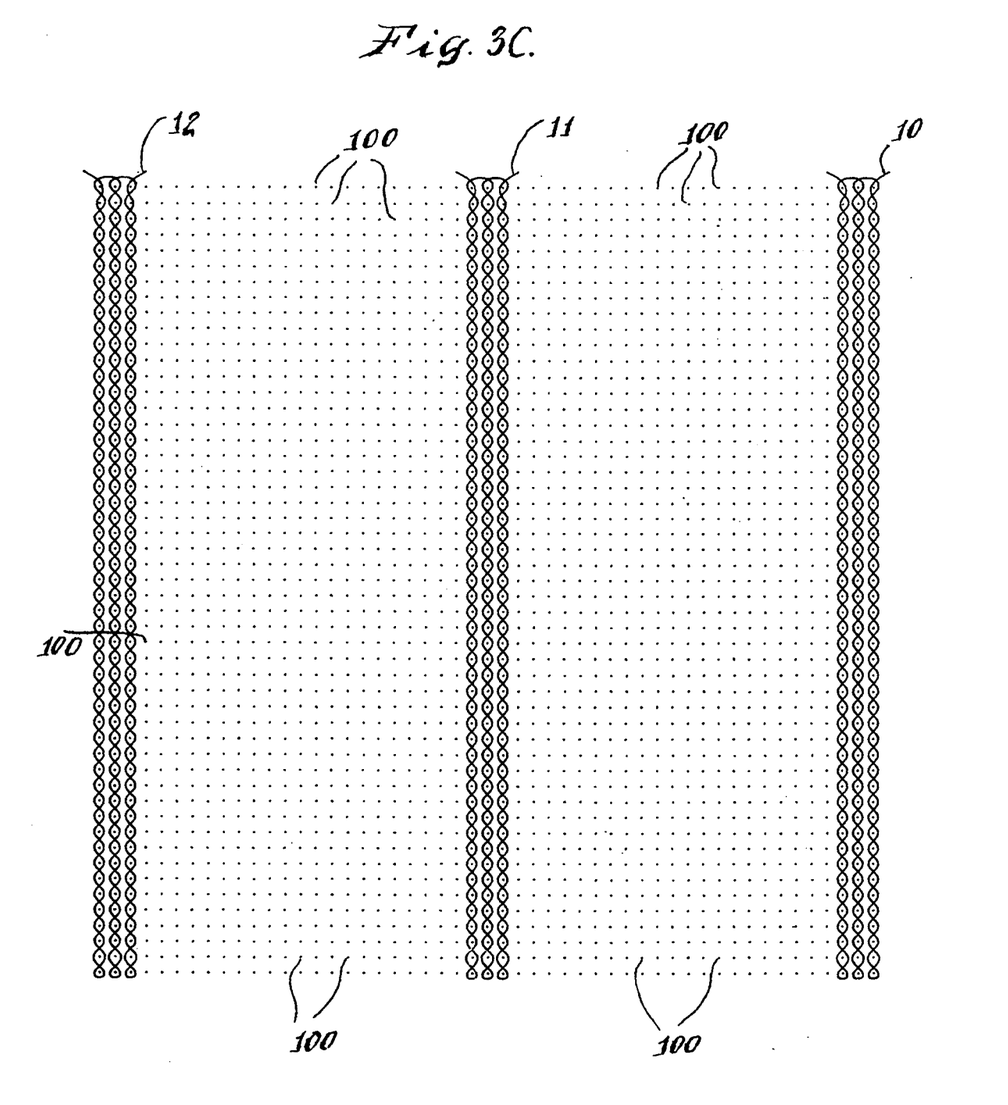
Figure 3D:
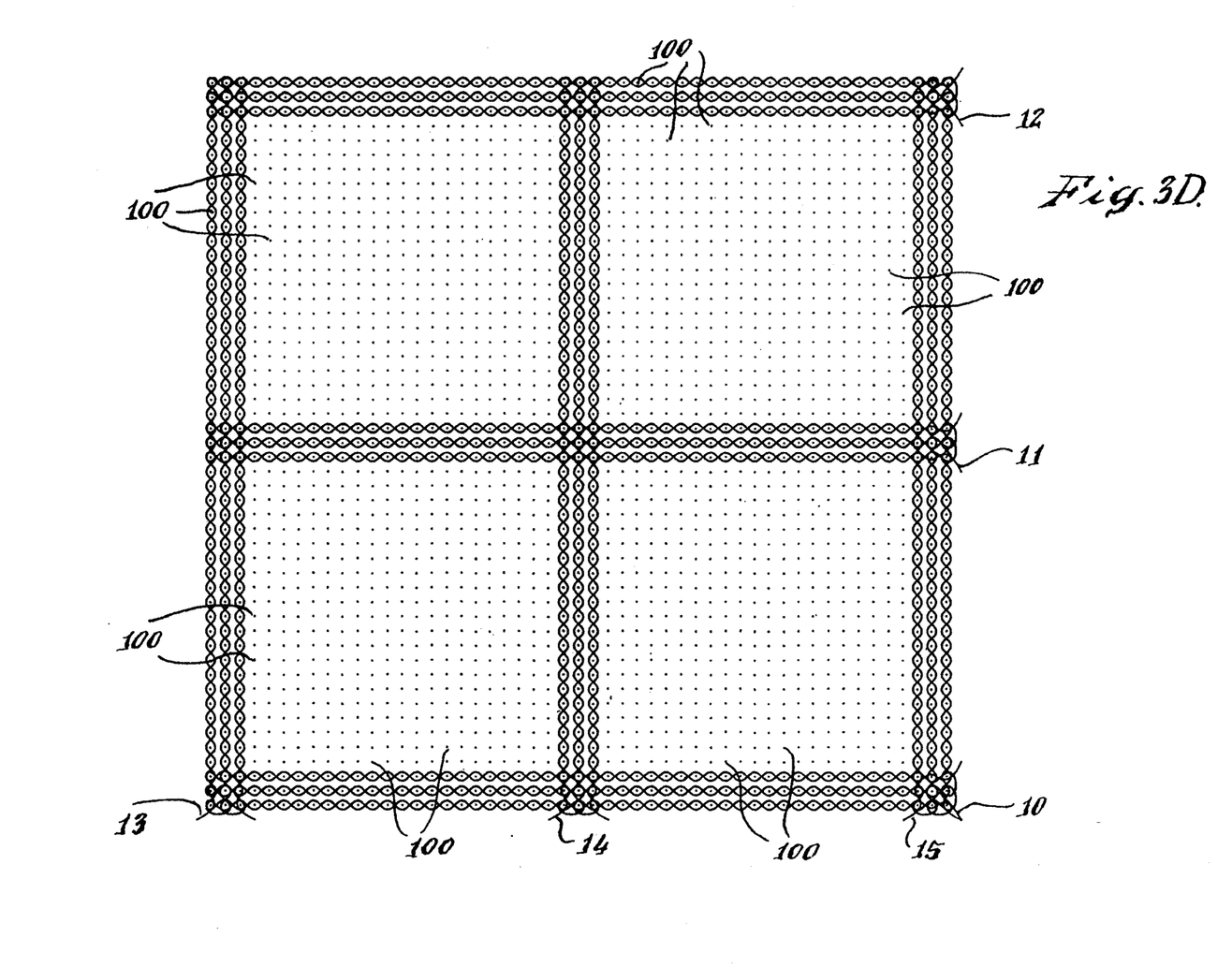
Figures 3E, 3F, 3G:
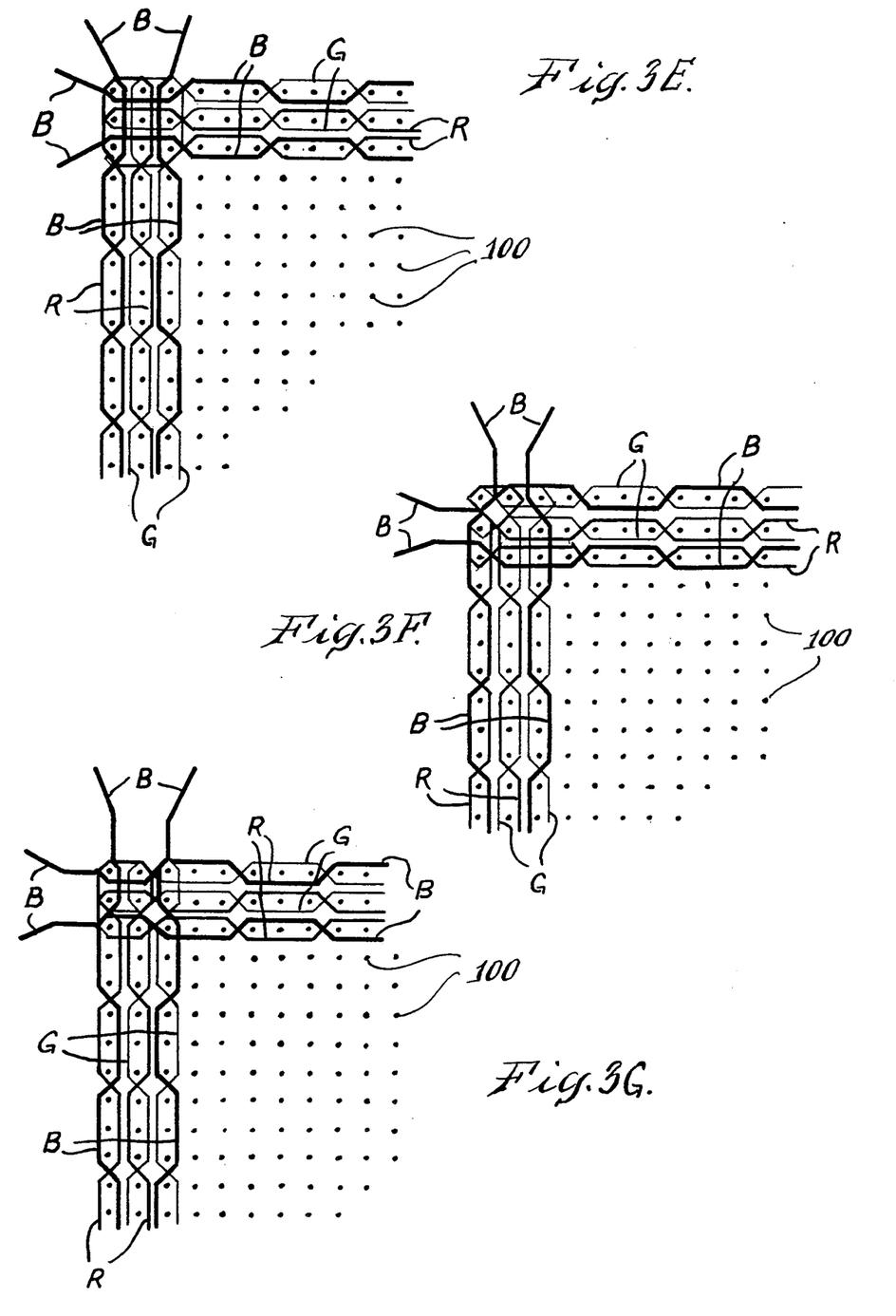

FIGS. 3C through 3E inclusive illustrate the steps in producing the rib elements of this preform. These ribs are in the form of wall-like elements extending upward from, and at substantially right angles to, the top surface of the base element of the preform just described. As shown in FIG. 3C, yarn 10A starts at the upper right position, which is the location of one end of the right-hand edge reinforcing rib portion of the preform. Beginning with the right-hand most vertical row of rods, it weaves down and then up, sequentially undulating left and right about successive rods as it proceeds downward until it comes to the bottommost rod. There Yarn 10A reverses direction and proceeds upward along the same row of rods, undulating about successive rods again, but this time on the opposite side of each rod from that which it came to occupy on its trip down. When it reaches the top of the righthand vertical row of rods, it moves to the vertical row next to the left and replicates the same pattern with respect to the rods in that row as that which it followed in traversing the first row: undulating, and first downward and then upward. Since the objective in this instance is to create two "pockets" in the ribs, the same pattern is then replicated a third time along the rods constituting the third vertical row of rods in from the righthand edge of the rod array. Of course, the number of "walls" created will be a function of the number of "pockets" desired, which may range from as few as one to several or many.

Referring again to FIG. 3C, it will be seen that the path along which yarn 11 is installed is comparable to that just described for yarn 10, except Yarn 11 is installed along the three center vertical rows of rods. Similarly, yarn 12 is installed in the same pattern but along the three lefthand vertical edge rows of rods. The yarn arrays thus completed then represent the bottommost yarn arrays of the three rib walls which form each set of vertical middle and side ribs of the preform as it is to be in final form; (i.e., the one in each such wall that is adjacent to the base element).

Turning next to FIG. 3D, it will be seen that yarn configurations may next be installed comparable to this previously described, but with the rod grid rotated clockwise 90 degrees. The effect of this, with Yarn #13 going through the comparable sequence to that previously described as to Yarn #10, with Yarn #14 going through that comparable as to Yarn #11, and with Yarn #14 going through that comparable as to Yarn #12, is to complete the base layer of yarns for the walls of each of the ribs on all four sides and for the intersecting set of ribs through the center. In case of each elements so commenced, every abutment and intersection of ribs is integrated at their respective junctures, with common fibers extending through each such juncture into both of the elements which there meet. Subsequently, additional yarn layers may be installed replication the sequences of Yarns 10, 11, 12 and those of Yarns 13, 14, 15, to build up the height of the ribs to a desired level. As their height is built up, the undulations of the yarns forming the wall elements around the forming rods effectively create extensions of the channels through the base layer formed by those same rods. The effect of this is to produce channel paths through which, as will be described later, yarns may be installed vertically to replace the rods.

It should be noted here that the weave pattern just described, while illustrative, is not inclusive of the substantial number of various patterns which may be utilized in the practice of this invention. For example, although the configurations being described produce continuous "pockets", it may be desired to "compartmentalize" the otherwise continuous length of "pocket" into smaller segments. This may be done by switching a given yarn from one rod row to an adjacent one at selected points along the row. Of course, it is also possible for the elements formed to be in any of a number of patterns, since the principles of this invention are applicable to virtually any juncturing of fibrous preform structures of the type described, whether as abutments or intersections, and whether or not in combination with other elements such as the panel hereinbefore described. In addition, it is possible to have the yarns traverse more than one rod for each undulation, to create longer "floats" as between rods. In cases where more than one rod is traversed in a yarn run, it may be is desirable for the points of undulation to be staggered appropriately so that the "crossovers" of overlaid yarns as hereinafter described are distributed along their length rather than being stacked up at the same place. These concepts are illustrated in FIGS. 3E, 3F, and 3G, which show the upper left corner of the rod grid previously illustrated during the phase of building end abutting members such as the ribs previously described. However, in this instance, the weave pattern, instead of being analogous to a "plain" weave as shown in the previous Figures, is analogous to a "Satin" weave in that it has "floats" or straight runs of yarns between undulations of the yarns about groups of more than one of the rods. Thus, the yarns "R", "G", and "B" pass three rods on one side rather than one rod before undulating to the other side of the rod row on which it is being installed. It should also be noted that as illustrated in these Figures, the points at which the undulations occur in the second layer shown in FIG. 3F are one rod further along in their respective rod rows than are those in the first layer as shown in FIG. 3E. Similarly, those in the third layer shown in FIG. 3F are one step further along than are those in the second layer. These staggers are repeated, layer upon layer, to the effect that the undulations are distributed more or less even throughout the structure, thus enhancing the uniformity of properties throughout. As with other design parameters, these factors may be varied appropriately to the intended results, as will be apparent to those skilled in these arts.

It is apparent, then, that the configurations described are but among a great number of configurations and directions that may be followed, depending upon the final configuration desired for the rib members.

Upon completion of installation of the desired layers of yarns necessary to complete the ribs, the rods 100 may be pulled out and replaced with additional yarns, thus providing yarn arrays which are oriented substantially perpendicular to the base of the rod grid and extend continuously through the base element and the rib element walls. In this instance, a base panel member having been included in the preform, this direction is also perpendicular to the top surface of the base element of the preform. The rods may be replaced sequentially while the yarn which replaces it is left continuous from one rod position to the next, thus providing integrity to the preform by the resulting "sewing" pattern of the replacement yarns. Those rods 100 which penetrate the base but not the ribs may also be replaced with yarns in a similar manner of "sewing" if additional preform integrity is desired and/or if additional properties are desired for the finished composite in a direction normal to the base.

Following that, bias oriented fibers, and/or reinforcing members such as the bias weave scrim of the type illustrated in FIG. 2, may be introduced into one or more of the reinforcing rib pockets. Optionally, they may be secured there if desired to facilitate handling of the preform while further further steps are being taken toward completing it, including filling it with matrix materials. The fiber reinforced composite structure may then be completed by infiltrating and encasing the preform with the selected matrix material, and curing it appropriately for the selected composite material and its intended application, all according to known per se procedures. The result of practicing the teachings of this invention is to produce a composite structure which is structurally sound and stable, and of improved performance characteristics.

It is to be understood that the embodiments of this invention herein discussed and shown are by way of illustration and not of limitation, and that other embodiments may be made without departing from the spirit or scope of this invention.

I claim:

1. A preform for infiltration with matrix material to produce a reinforced composite structure comprising
    at least two elements that are made using yarns and are angularly disposed with respect to each other and joined to each other along a juncture therebetween by yarns that are common to and integral with said elements, at least one of said elements including walls between which is included at least one internal pocket to receive reinforcement material.

2. The preform described in claim 1 which includes three elements, each of which is angularly disposed with respect to the others among the three and is joined to the others along juncture lines by yarns that are common to and integral with the two elements which meet at each such juncture line, said juncture lines coming together at a common point.

3. The preform described in claim 1 wherein said elements are substantially at right angles to each other.

4. The preform described in claim 2 wherein said elements are substantially at right angles to each other.

5. The preform described in claim 1 including reinforcement material positioned in said pocket which increases at least one among the shear stiffness and shear strength characteristics of said element when it is matrix infiltrated.

6. The preform described in claim 2 including reinforcement material positioned in said pocket which increases at least one among the shear stiffness and shear strength characteristics of said element when it is matrix infiltrated.

7. The preform described in claim 3 including reinforcement material positioned in said pocket which increases at least one among the shear stiffness and shear strength characteristics of said element when it is matrix infiltrated.

8. The preform described in claim 4 including reinforcement material positioned in said pocket which increases at least one among the shear stiffness and shear strength characteristics of said element when it is matrix infiltrated.

9. The preform described in claim 5 infiltrated with matrix material.

10. The preform described in claim 6 infiltrated with matrix material.

11. The preform described in claim 7 infiltrated with matrix material.

12. The preform described in claim 8 infiltrated with matrix material.

13. A preform for a fiber reinforced composite structural panel member comprising
    a base element formed from a multiplicity of overlaid, contacting, substantially planar arrays of yarns, in which said arrays, at selected locations, selected among said yarns are closely spaced apart from each other to form spaces therebetween, with the spaces so formed in adjacent arrays aggregating to form channels that are angularly oriented with respect to said arrays, the yarns of said arrays being angularly oriented with respect to those of each adjacent array,
    a multiplicity of rib members extending from at least one surface of said base element, each of which rib members comprises at least two parallel planar wall arrays of yarns, the bases of which overlay selected among said channels, the yarns of each of which planar wall arrays undulate and form extensions of said channels, said rib members being arranged into abutting and intersecting junctures of two such elements each in which each constituent rib member is angularly disposed with respect to the other in that group and to said base member, and is joined to each of them along a juncture line between them by yarns that are common to and integral with the two elements which meet at each such juncture, said junctures coming together at common points, selected among said elements each including walls between which is included at least one internal pocket which contains at least one reinforcing insert which increases at least one among the characteristics of shear stiffness and shear strength of said element when it is matrix infiltrated, and
    yarns extending through selected among said channels and the respective extensions thereof to provide yarns which are structurally common to and integral with both said wall arrays of said rib members and said base member.

14. The preform described in claim 13 wherein said reinforcing insert is a bias ply fabric.

15. The preform described in claim 13 infiltrated with matrix material.

16. The preform described in claim 14 infiltrated with matrix material.

* * * * *